(12) United States Patent
Flynn et al.

(10) Patent No.: US 8,316,603 B2
(45) Date of Patent: Nov. 27, 2012

(54) INSULATING PANEL MADE OF TWO PANEL PORTIONS

(75) Inventors: Gregory Flynn, Collon (IE); James Carolan, County Cavan (IE)

(73) Assignee: Kingspan Research and Developments Limited, Kingscourt, County Cavan (IE)

( * ) Notice: Subject to any disclaimer, the term of this patent is extended or adjusted under 35 U.S.C. 154(b) by 259 days.

(21) Appl. No.: 12/227,854

(22) PCT Filed: Jun. 11, 2007

(86) PCT No.: PCT/IE2007/000055
§ 371 (c)(1),
(2), (4) Date: Dec. 1, 2008

(87) PCT Pub. No.: WO2007/144862
PCT Pub. Date: Dec. 21, 2007

(65) Prior Publication Data
US 2009/0165412 A1     Jul. 2, 2009

(30) Foreign Application Priority Data

Jun. 13, 2006 (IE) .................................. 2006/0444
Jan. 4, 2007 (IE) .................................. 2007/0004

(51) Int. Cl.
*E04C 1/00* (2006.01)
(52) U.S. Cl. .................................. 52/309.3; 52/309.15

(58) Field of Classification Search ................. 52/309.3, 52/309.1, 309.14, 309.15, 794.1, 746.1
See application file for complete search history.

(56) References Cited

U.S. PATENT DOCUMENTS

| | | | | |
|---|---|---|---|---|
| 3,466,831 A | * | 9/1969 | Lenoir | 52/521 |
| 4,241,555 A | * | 12/1980 | Dickens et al. | 52/454 |
| 4,575,981 A | * | 3/1986 | Porter | 52/309.9 |
| 7,784,223 B1 | * | 8/2010 | Ramey | 52/79.1 |
| 2006/0059808 A1 | | 3/2006 | Nguyen | |
| 2006/0096213 A1 | * | 5/2006 | Griffin et al. | 52/409 |

FOREIGN PATENT DOCUMENTS

| GB | 2 325 640 | 12/1998 |
|---|---|---|
| GB | 2 396 166 | 6/2004 |

OTHER PUBLICATIONS

International Search Report dated Sep. 28, 2007.

* cited by examiner

*Primary Examiner* — Jeanette E Chapman
*Assistant Examiner* — Daniel Kenny
(74) *Attorney, Agent, or Firm* — Jacobson Holman PLLC

(57) ABSTRACT

An insulated panel includes a first panel portion and a second panel portion which are identical. Each panel portion includes an outer profiled sheet and an inner backing tray with a foam core therebetween. The panel portions each have external sheet overlap parts and backing sheet overlap parts. The corresponding overlap parts of adjacent panel portions are bonded together at the overlap. The bonding may be by an adhesive.

17 Claims, 4 Drawing Sheets

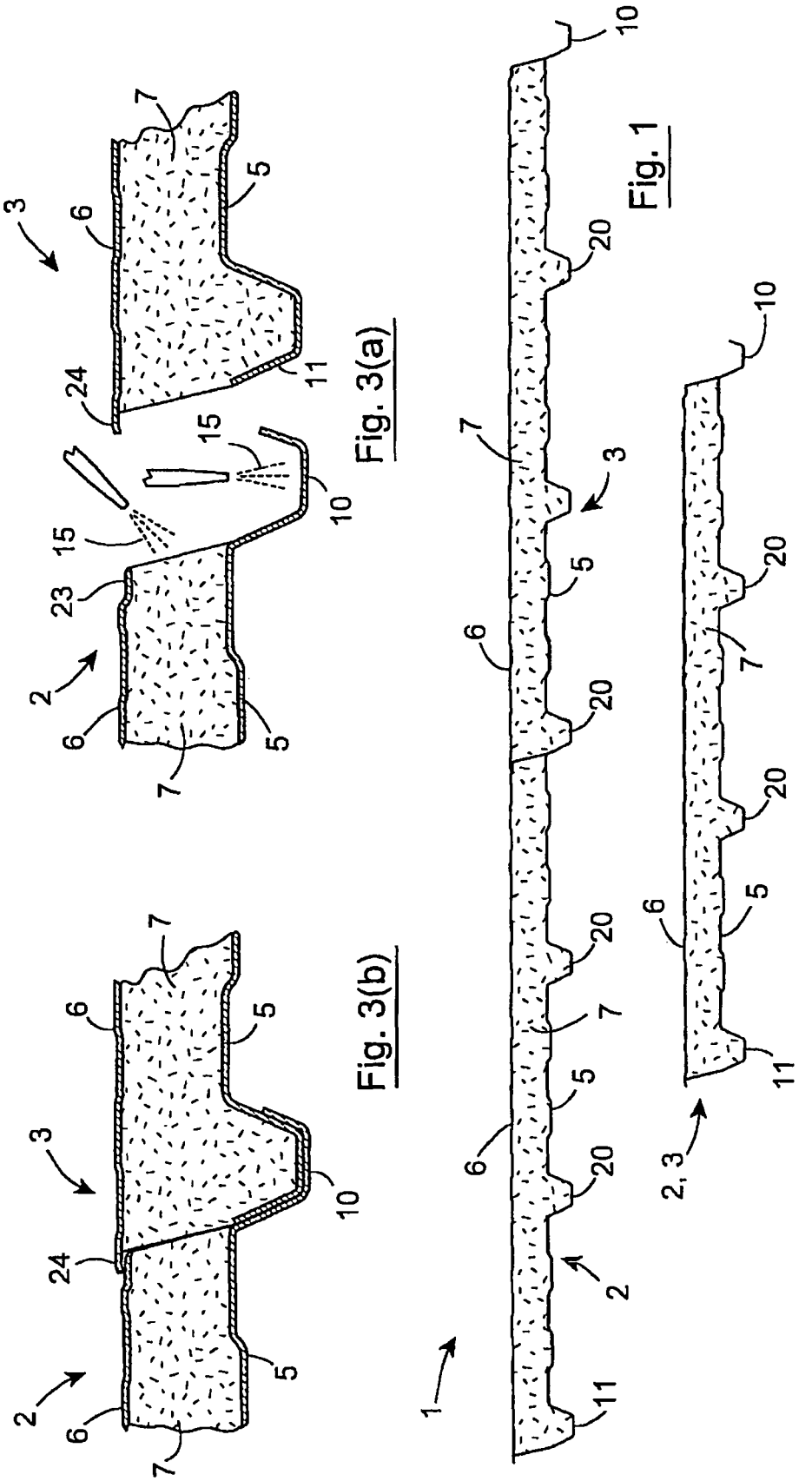

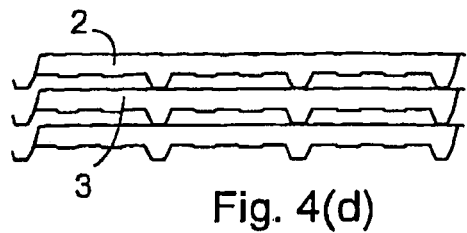
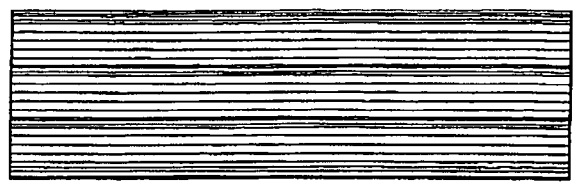
Fig. 4(d)
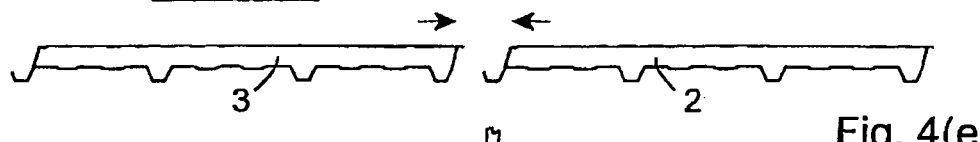
Fig. 4(e)
Fig. 4(f)
Fig. 4(g)
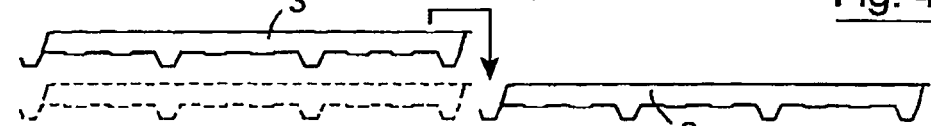
Fig. 4(h)
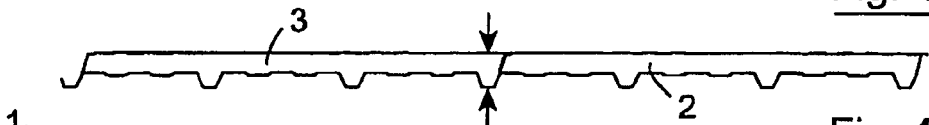
Fig. 4(i)
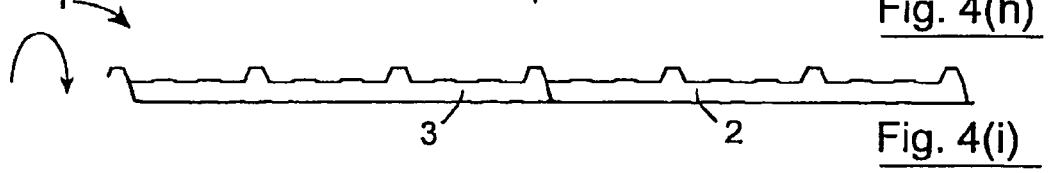
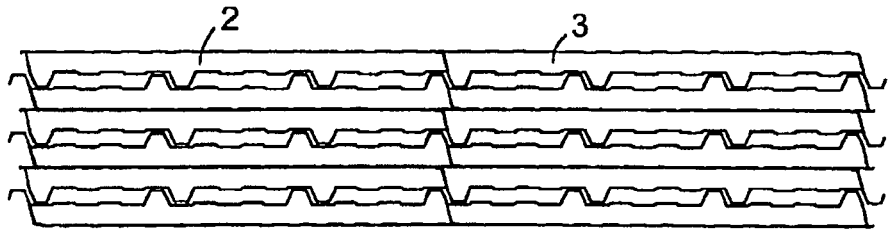
Fig. 4(j)
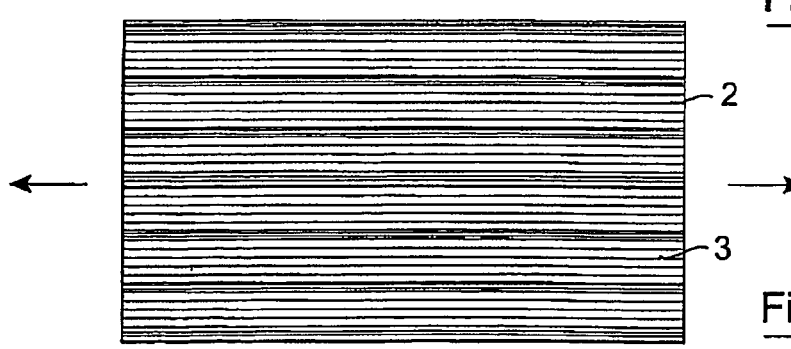
Fig. 4(k)

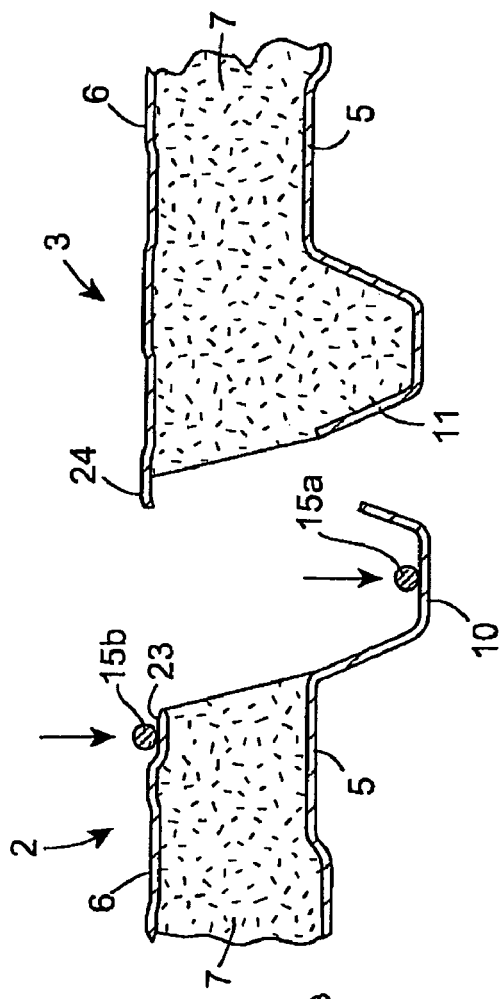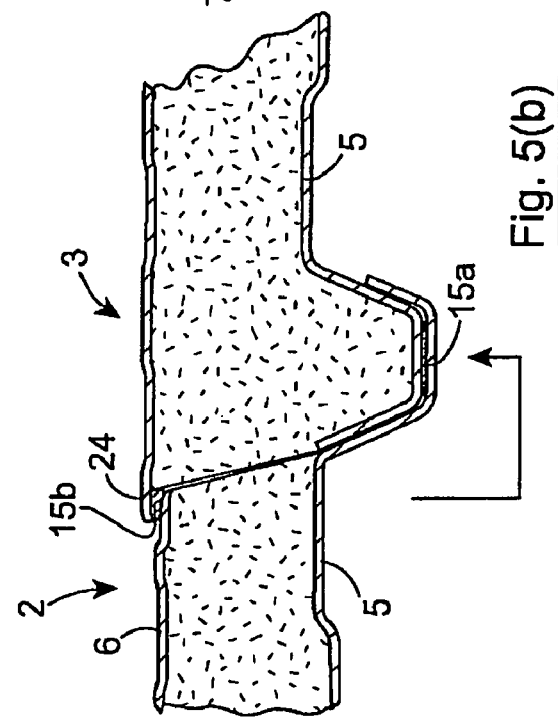

INSULATING PANEL MADE OF TWO PANEL PORTIONS

This is a national stage of PCT/IE07/000055 filed Jun. 11, 2007 and published in English, which has a priority of Irish no. 2006/0444 filed Jun. 13, 2006 and priority of Irish no. 2007/0004 filed Jan. 4, 2007, hereby incorporated by reference.

The invention relates to composite insulation panels of the type comprising inner and outer skins with a body of insulating material therebetween.

Insulation panels of this type are widely known and used extensively, especially for roof and wall panels in buildings.

There are however limitations on the size of the panels that can be manufactured using known technologies.

There is therefore a need to provide an improved panel and associated manufacturing technique which will overcome at least some of these drawbacks.

STATEMENTS OF INVENTION

According to the invention there is provided a manufactured insulating panel comprising
 a first panel portion; and
 a second panel portion similar to the first panel portion
 the first and second panel portions each being of the type comprising a profiled external skin and an internal backing tray having an insulating foam core therebetween,
 the panel portions each having an overlap part for receiving part of an adjacent like panel, on assembly,
 the first and second panel portions being bonded together at the overlap parts therebetween.

In one embodiment the overlap parts are side overlap parts. In one embodiment the external sheet of the panel portions have a longitudinally extending recessed region along both side edges, the recess region along one side being filled with foam and defining a male side overlap part and the recessed region along the opposite side being open to define a female overlap part for reception of the male overlap part of an adjacent panel portion. The recess regions may be of generally trapezoidal form.

In a preferred embodiment the recessed regions of the external sheets are bonded together at the side overlap.

In one embodiment the backing sheet of the panel portions comprise a projecting part extending along one side edge and a recessed part extending along the opposite side edge, the projecting and recessed parts of the backing sheets of the panel sections being overlapped.

In this case preferably the backing sheet projecting part and recessed part of the panel portions are bonded together at the side overlap.

In one case the panel portions are adhesively bonded.

In one embodiment at least one further similar panel portion is bonded to the first or the second panel portion.

The manufactured insulated panel may have a width of from about 2 to 3 meters.

Preferably the manufactured panel has a width of about 2 metres.

In a preferred embodiment there are two panel portions and the width of each panel portion is half the width of the insulated panel.

The invention also provides a stack comprising a plurality of insulated panels of the invention. The panels in the stack are preferably nested. Alternate panels in the stack are preferably in different orientations.

In another aspect the invention provides a method for manufacturing an insulating panel comprising the steps of:
 providing a first insulating panel portion;
 providing a second insulating panel portion;
 the first and second panel portions each being of the type comprising a profiled external skin and an internal backing tray having an insulating core therebetween, the panel portions each having an overlap part for receiving part of an adjacent like panel portion, on assembly,
 placing the first and second panel portions such that corresponding overlap parts of the panel portions are engaged, and
 before, during or after the engagement of the overlap parts, bonding the panel portions at the joint therebetween to provide a manufactured insulating panel.

In one embodiment the method comprises the step, prior to engagement, of applying an adhesive to the overlap parts of the panel portions.

In one case, prior to application of the adhesive at least one of the side overlap parts are pre-treated. The pre-treatment may comprise heating.

In one embodiment the method comprises post-treating after joining of the panel portions. The post-treating may comprise pressing the panel portions together at the joint therebetween.

In one case the overlap parts are side overlap parts.

In one embodiment the method comprises the step of stacking the panels. The method may comprise the step of inverting alternate panels during stacking.

BRIEF DESCRIPTION OF THE DRAWING

The invention will be more clearly understood from the following description thereof given by way of example only, in which: —

FIG. 1 is a cross sectional view of an insulating panel of the invention;

FIG. 2 is a cross sectional view of one of the two panel portions which make up the panel of FIG. 1;

FIGS. 3(a) and 3(b) are cross sectional views illustrating the jointing of the panel portions to form the panel of FIG. 1;

FIGS. 4(a) to 4(k) are diagrams illustrating various steps in a method for manufacturing the panel of FIG. 1; and FIGS. 5(a) and 5(b) are cross-sectional views illustrating another jointing of panel portions to form a panel.

DETAILED DESCRIPTION

Figure 4A:
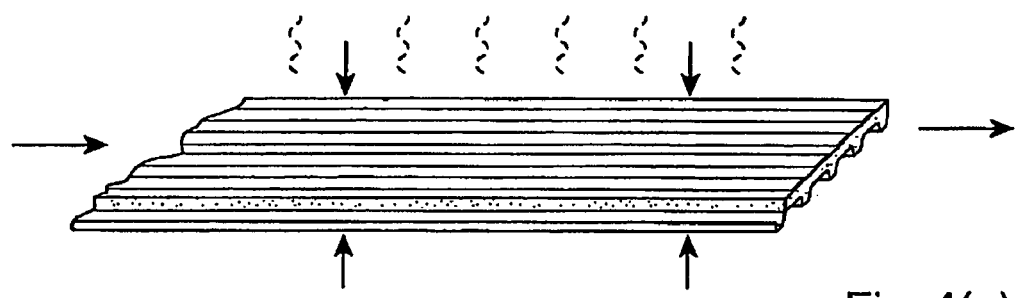

Referring to the drawings and initially to FIGS. 1 to 3 thereof there is illustrated an manufactured insulated panel 1 of the invention which comprises a first panel portion 2 and a second panel portion 3 which are identical. Each panel portion 2, 3 is approximately 1 meter wide and comprises an outer profiled metal sheet 5 and an inner backing tray 6 which is typically also of metal. A foam insulating core 7 which is a unitary body and may be, for example, of polyisocyanurate foam, is located between the inner and outer sheets 5, 6. The panel portions 2, 3, each have an overlap part, in this case a side overlap part 10, for receiving an overlap part 11 of an adjacent panel portion 2, 3, on assembly.

The corresponding overlap parts 10, 11 of adjacent panels 2, 3 are bonded together during manufacture at the overlap therebetween. In this case adhesive 15 is applied to one or both of the overlap portions 10, 11 which may be pre-treated to receive the adhesive or post-treated (for example by pressing) after engagement to ensure positive bonding between the overlap parts of the panel portions 2,3 and thereby forming a larger single panel 1 which is about 2 meters wide. Adhesive may be applied in the form of beads 15(a), 15(b) as illustrated in FIGS. 5(a) and 5(b). Such beads of adhesive can be readily applied in-line and provide particularly good sealing and bonding.

The external sheet 5 has a number of recesses which in this case are defined by trapezoidal shaped formations 20. One of the formations 20 is open to define a female overlap part 10 whilst the other formations 20 are filled with foam. The formation at the side of the panel section opposite to the side overlap part 10 defines a male side overlap part 11. When the panel sections are joined together during manufacture the male side overlap part 11 of one section 3 is received in the female side overlap part 10 of an adjacent panel section 2 as shown for example in FIGS. 5(a) and 5(b). It will also be noted that the backing sheet 6 of the panel sections 2, 3 have a projecting part 24 on one side and a recess or dimple 23 on the opposite side which, on jointing, define a recess which is filled with adhesive 15bSimilarly, on jointing, adhesive 15a is squeezed between the male overlap part 11 and the female overlap part 10 of adjacent panel sections. We have found that these metal to metal adhesive bonds are particularly effective in providing a bonded weatherproof joint. Because there is metal to metal bonding on both the backing sheet and external sheet the bonded panel has good strength during transportation and handling on site.

Advantages of the wide panel of the invention include speed of construction with less panel handling and consequential reduction in damage, less crane costs and the like. Further, the adhesive bonding of one panel to another before the panels are delivered to a construction site ensures that correct sealing and bonding between the joined panels can be assured. Thus quality assurance is improved. In addition, generally trailers are about 2 meters wide and can therefore more readily and efficiently accommodate the larger panel of the invention.

Figure 4B:
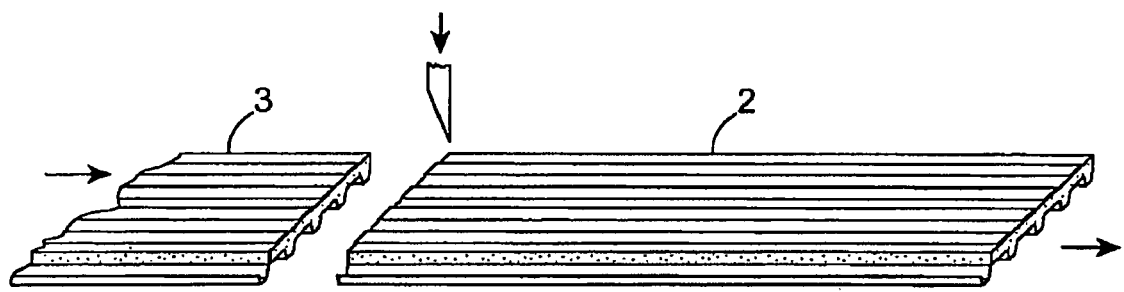
Figure 4C:

Referring to FIGS. 4(a) through 4(k) the various steps in the manufacture of the panel 1 of the invention are illustrated. Firstly [FIGS. 4(a) to 4(c)] a plurality of panels 2, 3 are manufactured, for example as described in detail our GB-A-2325640A the entire contents of which are herein incorporated by reference. Panels 2, 3 are drawn from a stack of the panels [FIG. 4(d)] and a pair of panels 2,3 are placed side-by-side with their corresponding side overlap portions adjacent [FIG. 4(e)]. If the panels in the stack are nested, every second one is turned over. Adhesive 15 is applied [FIG. 4(f)] and then one of the panels 3 is lifted up, moved across, and dropped onto the overlap portion of the panel 2 [FIG. 4(g)]. Pressure may be applied at the joint [FIG. 4(h)] to ensure bonding. After curing, panels 1 may be stacked, for example by turning alternate panels 1 [FIGS. 4(i), 4(j)].

The invention is not limited to the embodiments hereinbefore described which may be varied in detail.

The invention claimed is:

1. A manufactured insulating panel comprising
a first panel portion; and
a second panel portion substantially the same as the first panel portion,
the first and second panel portions each including a profiled external metal sheet and an internal metal backing tray having a foam insulating core therebetween, the foam insulating core being entirely exposed and in contact between the panel portions at both side edges of the panel portions,
the panel portions, at the profiled external metal sheet and at the internal metal backing tray, each having an overlap part for receiving part of an adjacent panel portion, on assembly,
the first and second panel portions being bonded together at the overlap parts therebetween, the overlap parts being located at the side edges of the panel portions,
the external sheet of the panel portions having a longitudinally extending recessed region along both side edges, the recessed region along one side being filled with foam and defining a male side overlap part and the recessed region along the opposite side being open to define a female overlap part for reception of the male overlap part of an adjacent panel portion, and the recessed regions of the external sheets being bonded together at the overlap parts, the contact of the insulating core at both side edges being exclusive of the male side overlap part and the female side overlap part,
the backing tray of the panel portions including a projecting part extending along one side edge and a recessed part extending along the opposite side edge, the projecting and recessed parts of the backing sheets of the panel sections being overlapped and spaced apart from each other to define a gap containing an adhesive bead, the projecting part of the one side edge of one panel portion projecting above the backing tray of an adjacent panel portion, and the backing tray projecting part and recessed part of the panel portions being bonded together at the side overlap while maintaining the gap filled with adhesive.

2. The insulating panel as claimed in claim 1, wherein the recess regions are of generally trapezoidal form.

3. The insulating panel as claimed in claim 1, wherein at least one further first or second panel portion is bonded to the first or the second panel portion.

4. The insulating panel as claimed in claim 1, having a width of from about 2 to 3 meters.

5. The insulating panel as claimed in claim 4, wherein there is only one first panel portion and one second panel portion and the width of both of the first and second panel portions is half the width of the insulating panel.

6. The insulating panel as claimed in claim 1, having a width of about 2 meters.

7. A stack comprising a plurality of insulating panels as claimed in claim 1.

8. The stack as claimed in claim 7, wherein the panels in the stack are nested.

9. The stack as claimed in claim 8, wherein alternate panels in the stack are in different orientations.

10. A method for manufacturing an insulating panel comprising the steps of:
providing a first insulating panel portion;
providing a second insulating panel portion;
the first and second panel portions each including a profiled external metal sheet and an internal metal backing tray having an insulating core therebetween, the foam insulating core being entirely exposed and in contact between the panel portions at both side edges of the panel portions,
the panel portions, at the profiled external metal sheet and at the internal metal backing tray, each having an overlap part for receiving part of an adjacent panel portion, on assembly, and the recessed regions of the external sheets being bonded together at the overlap parts, the backing tray of the panel portions including a projecting part extending along one side edge and a recessed part extending along the opposite side edge, the projecting and recessed parts of the backing sheets of the panel sections being overlapped and spaced apart from each other to define a gap therebetween, placing the first and second panel portions such that corresponding overlap parts of the panel portions are engaged; and before, during or after the engagement of the overlap parts, bonding the panel portions at the joint therebetween at the foam insulating core in contact between the panel portions at both side edges to provide a manufactured insulating panel with the projecting part of the one side edge of one panel portion projecting above the backing tray of the other panel portion and the gap being filled with adhesive.

11. The method as claimed in claim 10, further comprising post-treating after joining of the panel portions.

12. The method as claimed in claim 11, wherein the post-treating comprises pressing the panel portions together at the joint therebetween.

13. The method as claimed in claim 10, further comprising the step of stacking the panels.

14. The method as claimed in claim 13, further comprising the step of inverting alternate panels during stacking.

15. The method as claimed in claim 10, further comprising the step, prior to engagement, of applying an adhesive to the overlap parts of the panel portions.

16. The method as claimed in claim 15, wherein prior to applications of the adhesive at least one of the side overlap parts are pre-treated.

17. The method as claimed in claim 16, wherein the pre-treatment comprises heating.

* * * * *